R. C. BRYANT & J. M. DARLING.
DRIER FOR SEED CORN.
APPLICATION FILED APR. 20, 1912.
1,052,457.
Patented Feb. 11, 1913.
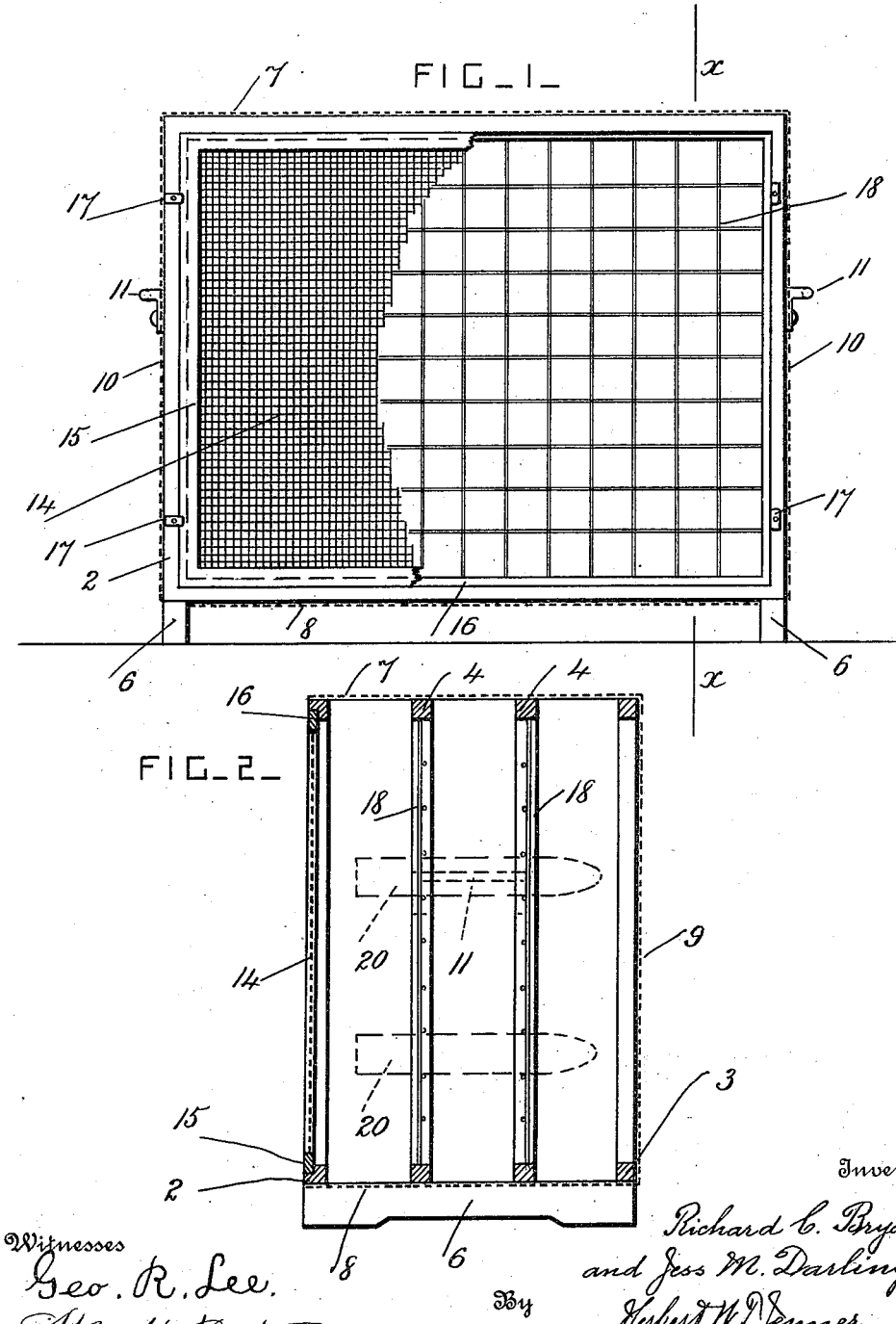

UNITED STATES PATENT OFFICE.

RICHARD C. BRYANT AND JESS M. DARLING, OF ROANOKE, ILLINOIS.

DRIER FOR SEED-CORN.

1,052,457.  Specification of Letters Patent.  Patented Feb. 11, 1913.

Application filed April 20, 1912. Serial No. 692,171.

*To all whom it may concern:*

Be it known that we, RICHARD C. BRYANT and JESS M. DARLING, residing at Roanoke, in the county of Woodford and State of Illinois, have invented certain new and useful Improvements in Driers for Seed-Corn; and we do hereby declare the following to be a full, clear, and exact description of the invention, such as will enable others skilled in the art to which it appertains to make and use the same.

This invention relates to driers or storage receptacles for seed corn; and it consists of a cabinet or receptacle covered with wire gauze and provided with compartments for the ears of corn as hereinafter fully described and claimed.

In the drawings, Figure 1 is a front view of the drier or storage receptacle constructed according to this invention. Fig. 2 is a cross-section through the drier, taken on the line $x$—$x$ in Fig. 1.

The framework of the drier is formed of a front frame 2, a rear frame 3, and two intermediate frames 4. All these frames are rectangular frames of the same size, and they are arranged parallel to each other, and have their bottom portions secured to crosspieces 6 which form feet for the receptacle to stand on, when placed on the ground or on a shelf.

The top 7, bottom 8, back 9, and sides 10, of the drier are all formed of sheets of coarse wire gauze, which will admit air and keep out mice and insects. These sheets of gauze are tacked, or are otherwise secured, to the edges of the four frames. Handles 11 are secured to the sides of the intermediate frames for convenience in moving the drier from place to place.

The front of the drier is formed of a sheet of wire gauze 14 secured to a separate frame 15, and the frame 15 is let into a recess 16 in the front frame 2, and is secured by turnbuttons 17, or other approved fastening devices.

The two intermediate frames 4 are each provided with wires or bars 18 arranged crosswise of each other, and soldered or otherwise secured together at their points of contact. These wires form rectangular spaces which are arranged in line with each other, so that the ears of corn 20 can be placed in the compartments formed by each pair of spaces, as shown in Fig. 2. The air is free to circulate between the ears of corn, and the corn is preserved from injury.

This drier is very inexpensive to construct, and its parts can be shipped to any part of the country in knock-down form, and can be put together without skilled labor.

What we claim is:

1. A drier for seed corn, comprising four parallel rectangular frames, two crosspieces secured to the said frames and holding them at prearranged distances apart, sheets of wire gauze secured to the frames and forming the top, bottom, back and sides of the drier, wires or bars arranged crosswise of each other and secured to the two intermediate frames and forming compartments for the ears of corn, and a door formed of a frame and a sheet of wire gauze and connected to the front frame of the drier.

2. A drier for seed corn, comprising a series of similar frames arranged vertically in parallel planes, supporting feet secured crosswise to the bottom edges of the frames and holding them apart, reticular top, bottom, back and side sheets, all formed of wire gauze and secured over all the said frames, supporting devices for the ears of corn secured within the intermediate frames, and a door connected to the front frame and formed of an auxiliary frame and a sheet of wire gauze.

In testimony whereof we affix our signatures, in presence of two witnesses.

RICHARD C. BRYANT.
JESS M. DARLING.

Witnesses:
CHARLES F. JACK,
T. P. PETTIGREW.

---

Copies of this patent may be obtained for five cents each, by addressing the "Commissioner of Patents, Washington, D. C."